Figure 1:
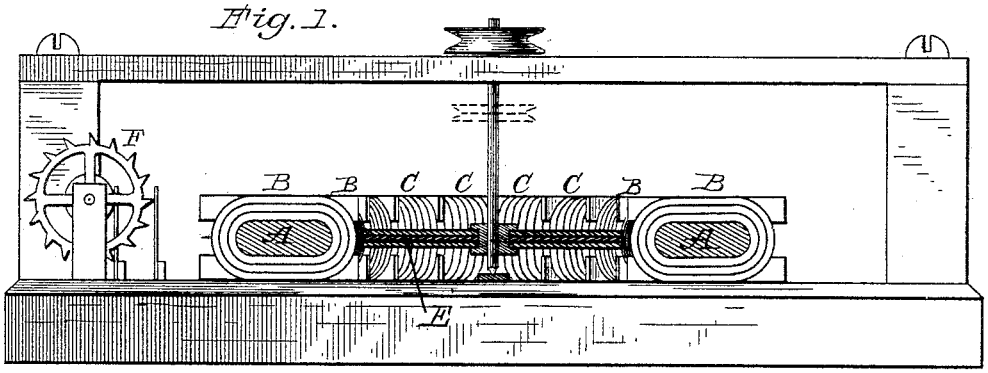

(No Model.) 2 Sheets—Sheet 1.

R. EICKEMEYER.
METHOD OF AND APPARATUS FOR DEVELOPING MECHANICAL MOTION FROM ELECTRICAL ENERGY.

No. 448,326. Patented Mar. 17, 1891.

Attest:
Philip F. Larner
Howell Bartle

Inventor:
Rudolf Eickemeyer
By [signature]
Attorney (No Model.) 2 Sheets—Sheet 2.
R. EICKEMEYER.
METHOD OF AND APPARATUS FOR DEVELOPING MECHANICAL MOTION
FROM ELECTRICAL ENERGY.
No. 448,326. Patented Mar. 17, 1891.
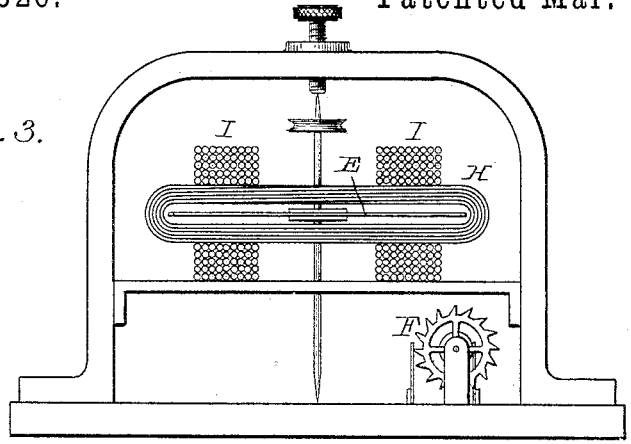
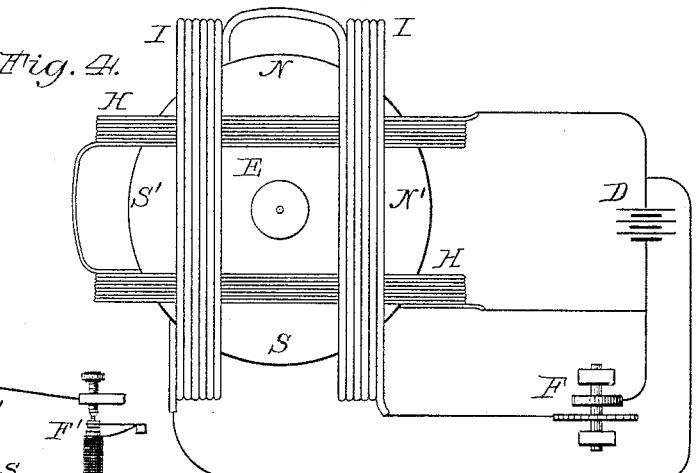
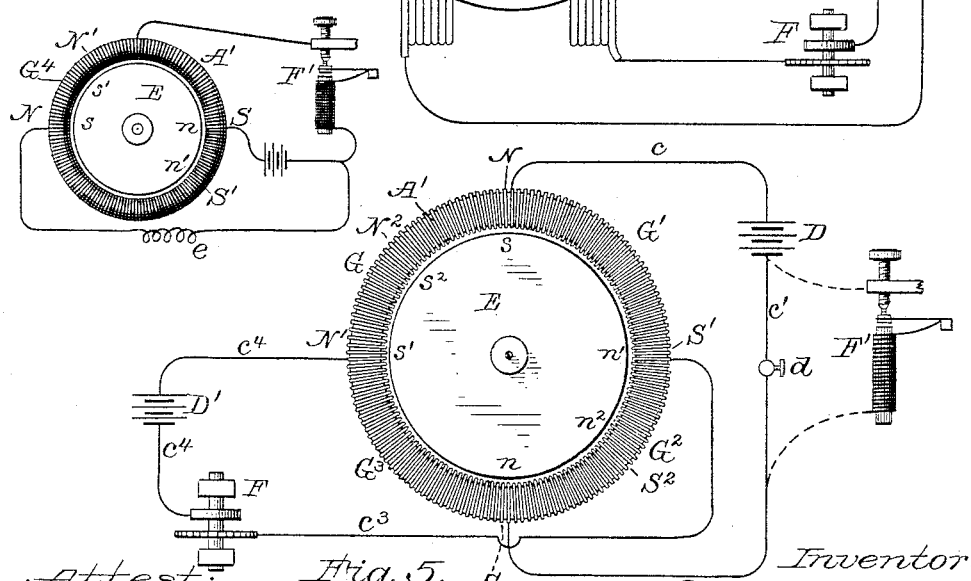
Attest:
Philip F. Larner.
Howell Battle.
Inventor:
Rudolf Eickemeyer.
By M. C. Wood
Attorney.

UNITED STATES PATENT OFFICE.

RUDOLF EICKEMEYER, OF YONKERS, NEW YORK.

METHOD OF AND APPARATUS FOR DEVELOPING MECHANICAL MOTION FROM ELECTRICAL ENERGY.

SPECIFICATION forming part of Letters Patent No. 448,326, dated March 17, 1891.

Application filed July 20, 1888. Serial No. 280,493. (No model.)

*To all whom it may concern:*

Be it known that I, RUDOLF EICKEMEYER, of Yonkers, in the county of Westchester and State of New York, have invented a certain new and useful Method of and Apparatus for Developing Mechanical Motion from Electrical Energy, and also a Mode of Operating Electric Motors in Accordance with said Method; and I do hereby declare that the following specification, taken in connection with the drawings furnished and forming a part thereof, is a clear, true, and complete description of the several features of my invention, and such portions thereof as may be appropriately herein embraced will be made the subjects of the claims hereunto annexed.

So far as my knowledge extends, all electric motors in which the field is derived from electro-magnets prior to my invention have necessarily embodied a commutator in some form for delivering to and taking from the motor the necessary electric energy under certain precise conditions as to direction and time, and said commutators must therefore of necessity always operate in perfect unison or synchrony or harmony with the movable element in the motor; or, otherwise stated, all of said prior electric motors have a capacity for rotative speed, which depends upon the rotative speed of the commutator or equivalent device.

My novel mode of developing mechanical motion from electrical energy involves developing polar conditions in one element of a motor through the operation of one portion of appropriate field - exciting electricity, then, without reversal of the poles, varying said polar conditions as to locality through the operation of another independent but appropriate supply of field - exciting energy, and also producing opposite but correspondingly varied polar conditions in the other or second element of the motor, the polar condition of one of said elements being changed or varied in advance of the change in the polar condition of the other, and thereby providing for such successive alternate attractive and repulsive magnetic conditions as are essential for enabling one of said elements to operate as the movable or driven portion of the motor.

Long after my present invention had been embodied by me in operative organizations I became cognizant of a certain French publication, the *Comptes Rendus,* of A. D. 1880, wherein on pages 800–910 and 969, volume 90, there is described a device called the "tourniquet electrique" of Messrs. de Fonvielle and Lotin. Said device is an electric motor, in which a permanent magnet is employed for affording a magnetic field, within which is located an armature carrying spools or bobbins, to which an alternating electric current is supplied in such a manner as to positively vary the polar conditions in the magnetic metal of the armature, and only incidentally or by induction to vary the polar conditions of the permanent magnet. Said motor, so far as relates to the non-employment of commutators in connection with the armature, resembles the motors devised by me; but under my novel method or process the armatures are not and need not be loaded down with spools or bobbins or any similar devices. Moreover, under my method the polar conditions are positively shifted or varied, both in the field and in the armature, and hence my machines will operate with greater power in proportion as the electric currents are strengthened and quickened, whereas in said permanent magnetic field under the same conditions the permanent magnet will be weakened. My machines cannot possibly develop any permanent magnetism in any portion of their organization, and their efficiency is due to that feature, whereas in the said "Tourniquet Electrique" efficiency must more or less decrease with every hour of its operation, because the alternation of the electric currents in the spools on the armature, located as they are between the poles of the permanent magnet, must from the outset operate with demagnetizing influences and gradually weaken the power of the machine until it becomes incapable of action.

I believe I am the first to thus vary the polar conditions, for instance, of the field-exciting element, and thereby to cause a resulting or consequent variation in the armature or driven element by feeding the first - named element with independent supplies of field-exciting electricity and in delivering said electricity thereto under such intermitting or pulsating conditions as will secure the aforesaid variations in the polar condition of the field-exciting element and consequent sequential variations in the armature or driven element. Otherwise stated, I have for the first time converted electric energy into mechanical motion by successively energizing separate field-exciting circuits for developing varied polar conditions in the presence of a movable magnetizable element, and sequentially developing in said movable element correspondingly-varied but opposite polar conditions, and I have thereby produced magnetic attractive and repulsive conditions under which said element is caused to move. The said device of de Forielle and Lotin is properly described in said publication as one involving what is termed "synchronisme electrique," because of its peculiar mode of operation; but in my motors there need be no synchronism whatever between the pulsative action of the electric energy and the rotative movement of the armature, and hence when said pulsative action is sufficiently rapid to cause the armature to smoothly rotate these pulsations need not be quickened or lessened for increasing or decreasing the speed of the armature, it being only necessary to increase or decrease the power of the exciting medium for varying the speed of the motor. In thus varying the speed it is therefore wholly immaterial whether the rapidity of the pulsative action be increased or lessened, provided that with the least power of the exciting medium the pulsations be sufficiently rapid to secure a smooth continuous rotation of the armature. It will of course be understood, however, that with energizing medium of great power applied under very slow pulsative conditions an armature would be caused to intermittingly move in harmony with the impulses, and also that with less electric energy the armature would be also intermittingly moved, but to a less extent under each pulsation. The aforesaid intermitting or pulsating conditions are found in any rapidly-broken or interrupted electric current, or in what is termed an "alternating current," because the latter also affords the intermitting excitation in the field, which is necessary for varying said polar conditions.

In motors capable of being operated by my novel method that element thereof which embodies the field-exciting helices or coils may or may not contain magnetizable metal, but in either case the other element must contain such metal. When one portion of the exciting-helices directly develops certain polar conditions in the magnetic metal of one of said elements, appropriate but opposite poles are developed by induction in the second of said elements, and when a separate portion of said exciting-helices directly develops a new polar condition in said magnetic metal by varying the positions of the poles in the one element then in sequential or progressive order, as to time, new polar conditions are established by induction in the magnetic metal of the second element. If, however, one of said elements contains all the magnetic metal and the other of said elements contains only the field-exciting helices divided into separate portions and these are separately and independently supplied with exciting energy alternately delivered thereto, the electrical impulses afford the variations in the magnetic field, which produce corresponding variations in the polar condition of the metal in the other element, and sequentially vary the position of its poles, as when both of said elements contain magnetic metal, as previously indicated.

It will of course be clearly understood, as hereinbefore indicated, that when in my motors the aforesaid polar variations occur there is no reversal of polar conditions, but a shifting of the directly-excited poles of both denominations from certain positions to certain other positions in an annular field in the presence of an armature containing magnetizable metal, and that these variations are sequentially followed by corresponding variations in the opposite or induced poles of both denominations in said armature, and hence my novel motors are radically characteristic in their mode of operation, in that therein the polar variations essential for developing mechanical motion are effected by field-affording helices variably energized by electricity, which is always delivered to their terminals in the matter of direction precisely as it leaves the terminals of the generators or other immediate sources of supply; or, in other words, the polar directions, as between the terminals of the generator and the terminals of the field-exciting helices, are never reversed for variably energizing the helices, and such reversal is only required for reversing the operation of the motor.

To more particularly describe my invention, I will refer to the accompanying two sheets of drawings, in which—

Figure 2:
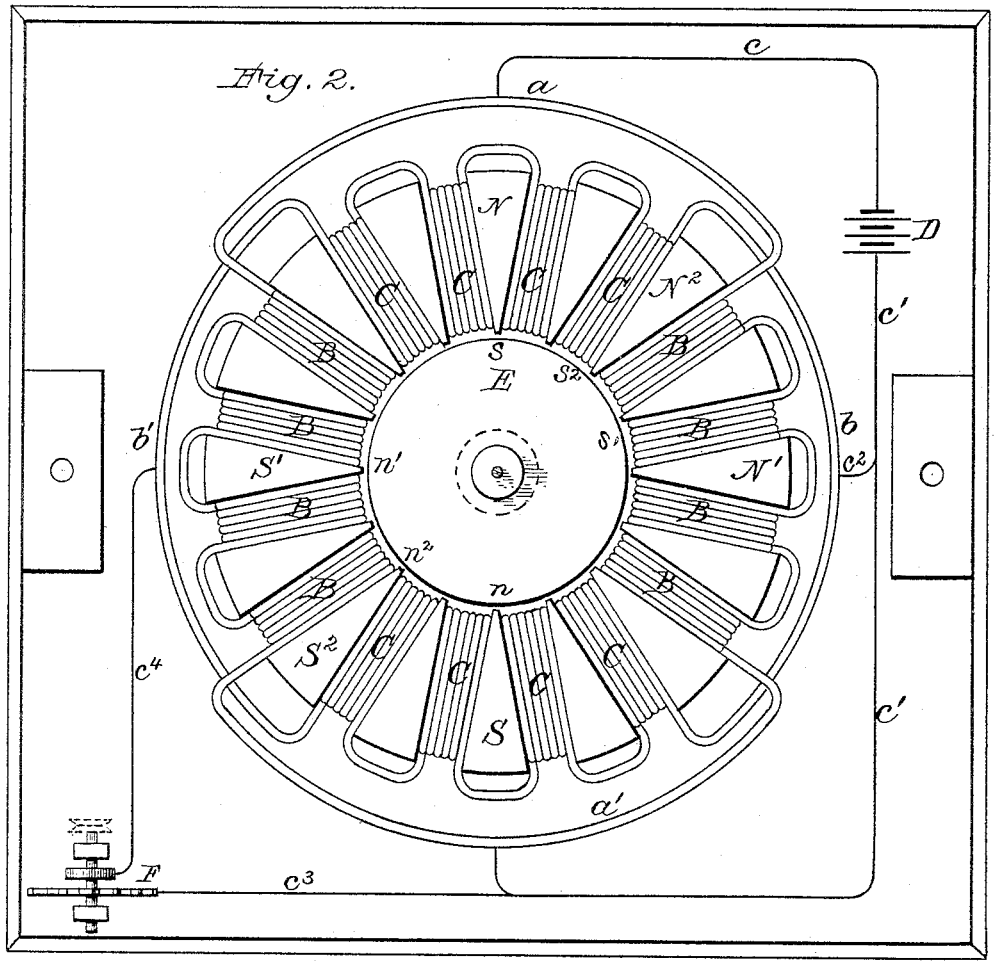

Figure 1 illustrates, partially in side view and partially in vertical cross-section, one of my novel electric motors, in which both of the elements contain magnetic metal. Fig. 2 illustrates the same machine in plan view coupled to an electric generator and provided with suitable electrical connections. Fig. 3 illustrates, partly in side view and partly in section, one of my novel electric motors, in which the magnetic metal is restricted to one element—i. e., the armature—the other element consisting only of exciting-helices. Fig. 4 is a plan view of both of said elements, an electric generator, and suitable connections. Fig. 5 illustrates a modification of the electro-magnet of machine, Figs. 1 and 2, as when operated by exciting-currents from separate generators. Fig. 6 illustrates a machine similar to Fig. 5, but having a different arrangement of the electric connections.

Referring to the machine shown in Figs. 1 and 2, it is to be understood that its stationary element consists of an annular mass or ring A of iron embraced by the several coils or helices, which are equally divided into two separate sets, each independent of the other. The set of coils B are eight in number, but four are on one side of the ring and four on the other or opposite side; but these are so connected by the conducting-wires $a$ and $a'$ that exciting energy applied in either direction may occupy the eight coils. The set of coils C are also eight in number, four on one side and four on the other side of said ring, and these, like the other set, are so connected by conducting-wires $b$ and $b'$ that exciting-currents in either direction may occupy the eight coils C. The source of the electricity suitable for supplying these exciting-coils may be widely varied; but for the purposes of illustration I here show a battery D in a conventional form; but it is to be distinctly understood that any generator, mechanical or chemical, may be used without departure from my invention, so long as the electrical energy available therefrom is capable of developing electro-magnetism.

It will be seen that the conductors $a$ and $a'$ of the eight coils B are coupled by the conductors $c$ and $c'$ with the poles of the generator D, and that therefore poles N and S must be directly developed in two oppositely-located portions of the ring-magnet A. The eight coils C are also fed or supplied by exciting energy from any suitable source, either from the same as that on which the coils B rely or from one wholly independent thereof; but, as here shown, their conducting-wires $b$ and $b'$ are coupled to the generator-conductor $c'$ by wire $c^2$ to $b$ and wires $c^3$ and $c^4$ to $b'$; but said wires $c^3$ and $c^4$ do not afford a continuous circuit, it being essential that the exciting medium by which at least one polar condition is directly developed must in its effective operations alternate with the effective operations of the exciting medium, by means of which said polar condition is varied or changed, so as to actually result in the direct but momentary development of a new polar condition in the magnetic ring having special reference to shifting or changing the location or position of the poles therein. As, for instance, if the coils B were not supplied with exciting energy while the coils C were being fed, then the latter would develop, for instance, one pole at N' and the other at S'. Then, again, if either or both sets of coils were pulsatively supplied with exciting energy, the result would be the shifting of the position of the poles toward and from $N^2 S^2$.

The movable element of this motor is the armature E, mounted to revolve on a suitable shaft or axis, which in this instance is vertically arranged and provided with a pulley for the transmission of power. This armature is of disk form, composed of iron, and being surrounded annularly by the electro-magnet in the same plane said armature has developed therein by induction polar conditions oppositely corresponding to such polar conditions as may from time to time be positively developed in the electro-magnet. As, for instance, opposite the poles N S the armature will have induced poles $s\ n$, opposite the poles N' S' induced poles $s'\ n'$, and opposite the poles $N^2 S^2$ induced poles $s^2\ n^2$, according in each instance to the variable conditions under which the field-exciting energy is supplied to the several coils or sets of coils of the magnet. Now in order to produce said variations in the polar condition of the electro-magnet, and consequently of the armature, it is only necessary to intermittingly or impulsively vary the feeding of the exciting energy to either or both of said sets of coils, and how this is done is quite immaterial, so long as either or both of the two sets of coils are intermittingly fed with the exciting electric energy so that said coils may be intermittingly or pulsatingly energized, and thereby made to afford the varying polar conditions, by which attraction and repulsion may be secured in regular order, as between the positively-varying poles of the electro-magnet and the induced varying poles of the armature. This intermittent or impulsive supply of the exciting energy can be readily provided for by the employment of a simple star-wheel circuit-breaker F, which is located in the circuit afforded by the wires $c^3$ and $c^4$, so that when said star-wheel is rotated the circuit is intermittingly opened and closed by the contact of each tooth of the wheel, and it is immaterial how the requisite impulsive exciting electric energy may be developed, or how this or any other type of circuit-breaker may be made or operated, or by an automatic vibrating circuit-breaker, as will be hereinafter more fully described, or even if no circuit-breaker be used at all, as when a generator furnishes electric energy under sufficiently broken conditions to be intermitting in its action, and to thereby cause the desired polar variations in the magnet. Now assuming the machine to be at rest and with a current in the coils B, which will develop the poles N S in the magnet and opposite thereto, induced poles in the armature at $s\ n$, and with no current in the coils C, because of the momentary break in their energizing-circuit, it will be seen that when exciting electric impulses are supplied to the coils C the polar conditions of the electro-magnet are varied by a shifting of the poles from N S to some point essentially between N S and N' S', and said point will be located, for instance, in illustration, at $N^2$ and $S^2$, and it will be obvious that, following this change sequentially and in some immeasurable variation in time, the poles $s^2$ and $n^2$ will be developed in the armature, and it is by this intermitting variation in the polar conditions of the two elements of the motor that the alternating magnetic attraction and repulsion is afforded by which mechanical motion is developed from the electrical energy supplied to the machine. If I couple each of these sets of coils to its own generator, I would secure an intermitting supply of exciting energy in but one of the sets of coils; but when with two generators I employ a continuous coil, coupled to the generator-conductors so as to afford in substance two separate sets of coils, these latter may be so operated as to provide for variations in the exciting medium in both circuits, because with the continuous coil portions thereof will at times be occupied by balancing or opposing electric energy—as, for instance, as illustrated in Fig. 5. In this instance the annular magnet A′ is wholly encircled by one coil continuous from end to end. This coil is in substance divided into four parts, because of the electric connections therewith, and for the purposes of reference they will be designated as parts G G′ G² G³. The generator D and the conductors $c\ c'$ are as in Fig. 2; but these conductors are respectively coupled to diametrically-opposite convolutions of the continuous coil. The conductors $c^3$ and $c^4$ and the circuit-breaker F are as in Fig. 2; but a generator D′ is coupled thereto, so that intermitting energy from said generator may be supplied at diametrically-opposite convolutions of the coil rectangular to those convolutions previously described. Now with the generator D′ cut out the electricity from generator D will enter at one side of the coil and leave at the other, developing, for instance, poles N and S near points respectively between parts G and G′ and G² and G³. With generator D cut out a current from generator D′ will develop in like manner poles N′ and S′; but for any given time, with both generators feeding the coil, then poles will be developed at or about N² and S², because parts G and G² will be, for instance, practically neutralized by opposing energy or impulses and parts G′ and G³ will be the active exciting portions of the coil, and hence any consecutive interruptions in the energy supplied to either circuit will so vary the polar conditions in the magnet as to produce opposite but corresponding polar variations in the armature, and therefore cause the latter to rotate, as before described.

I have hereinbefore referred to the employment of various means for affording the requisite pulsative supply of the energizing medium, and also to supplying both sets of helices with pulsating energy. It will be seen in Fig. 5 that the circuit-wire $c'$ is coupled at a binding-post $d$, so that the direct connection may be broken. Into this circuit I have introduced, as indicated in dotted lines, a well-known type of automatic vibrating circuit-breaker F′, so that when the latter is in active operation the motor will be driven, whether the circuit-breaker F be also in operation for pulsatively energizing the helices in its circuit or at rest, with its contacts so set as to afford a supply of non-pulsating energy to said helices. The desired operation of the motor will also accrue, if instead of having the circuit-breakers independent of each other they be coupled together, so as to alternately operate in their respective circuits by closing the one and opening the other—as, for instance, when two star-wheels are mounted on one shaft, one a little in advance of the other, or as when the vibrating contact of circuit-breaker F′ is arranged to operate in two circuits instead of only in one.

Now while I deem it generally preferable to employ magnetic metal in both of the elements of the motor, it is to be understood that said metal may be restricted to the armature as one element, leaving only the separate sets of exciting-helices to constitute the other element. In this case, however, the exciting-helices are flattened and arranged in pairs, one pair angular to the other and one within the other, and the disk of the armature partially within all of them. Such a machine is shown in Figs. 3 and 4. In this case the armature E is, as before described, and the same is true of the circuit breaker or interrupter F, and the circuits and generator D are like those in Fig. 2. The pair of exciting-coils H are composed of fine wire, and they are so wound and coupled to the generator that with the electrical energy applied in a proper direction they will, for instance, develop in the armature the poles at N S. Arranged crosswise of coils H and embracing them, as well as portions of the armature, are the coils I I, preferably composed of coarser wire, for affording less resistance than coils H, because said coils I I are occupied at rapid intervals by intermitting or pulsating electric energy. Without any energy in coils H the intermitting energy applied in proper direction in coils I I would develop, for instance, poles N′ and S′ on a line at right angles to the polar arrangement first indicated, and therefore when both or either of said coils are occupied intermittingly by any electric energy, however brief the intervals, an inductive field is afforded, which develops that intermitting variation in the location of the poles in the armature, which affords the progressive variable magnetic attraction and repulsion on which the rotation of the armature depends.

Although I have thus far described the exciting-helices in what may be termed a "quadrangular arrangement," it is not to be understood that said arrangement is the only one which can be relied upon in a motor operating in accordance with the main features of my invention. Instead of connecting a continuous coil with the generator at four points, I have obtained effective results by connecting said coil at three points only, as illustrated in Fig. 6. In this machine the magnet A′, its continuous coil, the armature E, and circuit-breaker F′ are all as in Fig. 5. In this case the two poles of the generator are coupled to diametrically-opposite convolutions of the magnet-coil, and one of said poles by way of the circuit in which the circuit-breaker is located is connected with one of the convolutions of said coil substantially equidistant from the other two points of connection, and these three points of connection might be equidistant without changing the results. With no energy supplied to the coil by way of the circuit-breaker the poles N S, for instance, will be developed by the other circuit; but when energy is supplied through the circuit-breaker the portion G⁴ of the coil is neutralized, and the poles are thereby shifted to points, say at N' S'. In this instance, as in Figs. 3 and 4, I provide for less resistance in the circuit-breaker circuit than in the other circuit; but instead of using wire of different sizes I here introduce a resistance-coil at $e$. With this latter arrangement of electric connection the pulsative effect in one circuit must obviously produce more or less pulsative effects in the other circuit; and this is equally true of the organizations shown in Figs. 4 and 5, whether the electric energy be derived from one or from two sources, because in either case the current is increased in one circuit when it is decreased in the other.

It will be readily obvious that in the movable element of my motors the changes in polar position are sequential and progressive, because its changes in polarity follow those of the helices and the electro-magnet, and as the armature revolves each of its poles is always in a condition as to polarity to be appropriately attracted and repulsed in the one direction of movement by the next-developed poles in the stationary element, and notwithstanding the fact that said poles in said stationary element alternate or shift back and forth to and from what would be their normal positions if the exciting energy was not impulsively or intermittingly operative in its action and effects upon or in the magnetic field.

I have devised other forms of machine varying in the arrangement of the helices and electric connections, but it is believed that those shown are fully ample for the purposes of this specification.

The machines illustrated in Figs. 5 and 6 of my drawings contain novel features of construction, which will be made the subject of a separate application for Letters Patent.

Having thus described my invention, I claim as new and desire to secure by Letters Patent—

1. The method of developing mechanical motion from electrical energy, which consists in intermittingly varying the polar conditions of an electro-magnetic field and in like manner varying induced polar conditions in a movable element by correspondingly varying separate supplies of field-exciting energy derived from any suitable source of electricity.

2. The method of operating electromotors, which consists in developing polar conditions in a magnetic field through the operation of one portion of appropriate field-exciting electricity, then intermittingly varying said polar condition through the operation of another independent but appropriate supply of field-exciting electricity, and also sequentially producing opposite but correspondingly-varied polar conditions in an armature or driven element, so that, the latter being capable of rotation and the polar conditions of the magnetic field being changed or varied in advance of the corresponding changes in the armature, there will be developed the alternate attractive and repulsive magnetic conditions essential for enabling said armature to operate as a movable or driven element.

3. The method of converting electrical energy into mechanical motion, which consists in feeding an element which affords a magnetic field with independent supplies of field-exciting electricity and in delivering said electricity under intermitting or impulsive conditions, and thereby positively developing variations in the polar condition of the magnetic field and sequentially developing consequent polar variations in a movable element or armature.

4. The method of converting electric energy into mechanical motion, which consists in positively developing varied polar conditions in an electro-magnet element by supplying it with field-exciting electricity by independent circuits and under intermitting or impulsive conditions, and sequentially developing in an armature element corresponding variations in its induced polar condition.

5. In an electric motor, a field-exciting element embodying helices organized into separate sets or divisions and capable of being separately and variably energized, means which independently supply said sets of helices with electric energy under impulsive or intermitting conditions, and an armature containing magnetizable metal which is variably polarized and made to move by the variable energization of the field-exciting element.

6. In an electric motor, an electro-magnet consisting of magnetizable metal annularly arranged, exciting-helices organized in separate sets or divisions, means which independently energize said helices with electric energy under impulsive or intermitting conditions for developing variable polar conditions in said electro-magnet, and a rotative armature containing magnetizable metal which is variably polarized by the variable polarization of said magnet and thereby caused to rotate.

7. In an electric motor, the combination, substantially as hereinbefore described, of a magnetizable armature, two sets of exciting-helices, two separate electric circuits for energizing said helices, and a circuit-breaker in one of said circuits causing one of said sets of helices to be intermittingly energized, and thereby varying the polar conditions of the armature and causing it to rotate.

8. In an electric motor, the combination, substantially as hereinbefore described, of a magnetizable armature, separate sets of exciting-helices, a separate circuit for energizing each set of helices, an electric generator common to both circuits, and a circuit-breaker in one of said circuits which causes one of said sets of helices to be intermittingly energized and which also intermittingly varies the energization of the other set of helices.

9. In an electric motor, the combination of an electro-magnet embodying exciting-helices for developing one pair of poles, a second set of helices for developing a second pair of poles, separate electric circuits for each of said sets of helices, means for alternately and variably energizing said two sets of helices, and a magnetizable armature which is variably polarized by or through the successive operations of said two sets of helices.

10. In an electric motor, the combination, substantially as hereinbefore described, of a magnetizable armature, an electro-magnet having separate sets of exciting-helices coupled to separate electric circuits, and means for separately supplying electric energy to said helices under impulsive conditions and causing said sets of helices to successively and alternately develop variable polar conditions in said magnet and to sequentially develop in the armature correspondingly varied but opposite polar conditions.

RUDOLF EICKEMEYER.

Witnesses:
ADOLF KROEBER,
PHILIP F. LARNER.